US012753796B2

(12) United States Patent
Nishida et al.

(10) Patent No.: US 12,753,796 B2
(45) Date of Patent: Oct. 6, 2026

(54) GAS BEARING DEVICE

(71) Applicant: MITSUBISHI HEAVY INDUSTRIES ENGINE & TURBOCHARGER, LTD., Sagamihara (JP)

(72) Inventors: Hideaki Nishida, Tokyo (JP); Takaya Futae, Tokyo (JP); Shuichi Isayama, Tokyo (JP); Shingo Tanaka, Tokyo (JP); Naomichi Shibata, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 39 days.

(21) Appl. No.: 18/839,270

(22) PCT Filed: Feb. 22, 2022

(86) PCT No.: PCT/JP2022/007284

§ 371 (c)(1),
(2) Date: Aug. 16, 2024

(87) PCT Pub. No.: WO2023/162015

PCT Pub. Date: Aug. 31, 2023

(65) Prior Publication Data

US 2025/0154980 A1 May 15, 2025

(51) Int. Cl.
*F16C 17/02* (2006.01)

(52) U.S. Cl.
CPC ........ *F16C 17/024* (2013.01); *F16C 2202/54* (2013.01); *F16C 2360/00* (2013.01)

(58) Field of Classification Search
CPC .... F16C 17/024; F16C 17/042; F16C 17/026; F16C 17/045; F16C 27/02
See application file for complete search history.

(56) References Cited

U.S. PATENT DOCUMENTS 3,809,443 A 5/1974 Cherubim et al.
4,300,806 A 11/1981 Heshmat
(Continued)

FOREIGN PATENT DOCUMENTS

CN 113090642 A 7/2021
DE 693 04 872 T2 4/1997
(Continued)

OTHER PUBLICATIONS

International Search Report, issued in PCT/JP2022/007284, PCT/ISA/210, dated Apr. 26, 2022.
(Continued)

*Primary Examiner* — John Olszewski
*Assistant Examiner* — Aimee Tran Nguyen
(74) *Attorney, Agent, or Firm* — Birch, Stewart, Kolasch & Birch, LLP

(57) ABSTRACT

This gas bearing device comprises: a bump foil that is disposed on a stationary holding member facing a rotary member, and has a corrugated shape with a plurality of continuous peaks; and a top foil disposed on the bump foil. The bump foil includes a first bump foil on the rotary member side, and a second bump foil on the stationary holding member side that are disposed to face each other. The first bump foil and the second bump foil engage with each other so that sloping surfaces of the peaks thereof overlap each other, and gaps are formed respectively between the tops of the peaks and between the bottoms of the first bump foil and second bump foil overlapping each other.

7 Claims, 5 Drawing Sheets

(56) References Cited

U.S. PATENT DOCUMENTS

| | | | | |
|---|---|---|---|---|
| 2006/0018574 | A1* | 1/2006 | Kang | F16C 27/02 384/106 |
| 2015/0275967 | A1* | 10/2015 | Ryu | F16C 33/04 384/116 |
| 2021/0010531 | A1* | 1/2021 | Omori | F16C 27/02 |

FOREIGN PATENT DOCUMENTS

| | | | |
|---|---|---|---|
| EP | 3 597 945 | A1 | 1/2020 |
| FR | 2 699 239 | A1 | 6/1994 |
| JP | 61-38323 | U | 3/1986 |
| JP | 2003-148461 | A | 5/2003 |
| KR | 10-2005-0105752 | A | 11/2005 |
| KR | 10-2013-0091445 | A | 8/2013 |
| KR | 10-1808008 | B1 | 12/2017 |
| WO | WO 2005/078294 | A1 | 8/2005 |

OTHER PUBLICATIONS

German Office Action for German Application No. 11 2022 006 035.2, dated Jan. 21, 2026, with English translation.

* cited by examiner

GAS BEARING DEVICE

TECHNICAL FIELD

The present disclosure relates to a gas bearing device that supports a high-speed rotating body.

BACKGROUND ART

A gas bearing device that supports a high-speed rotating body has conventionally been known in which a gas bearing portion is provided between a rotating member and a stationary holding member facing the rotating member and the gas bearing portion includes a bump foil that is disposed on the stationary holding member and that has a corrugated shape, and a top foil that is disposed on the bump foil.

For example, PTL 1 discloses a hydrodynamic gas bearing capable of ensuring, in a case where a fluctuating load or an impact load is applied due to eccentricity of a rotary shaft during rotation, a sufficient rigidity to restore the eccentric rotary shaft to its original position and damping that contributes to high-speed stability.

In addition, PTL 1 discloses a configuration in which a bump foil includes a lower bump foil on a stationary member side and an upper bump foil on a rotating member side, which are disposed to face each other, and the lower bump foil and the upper bump foil engage with each other in advance such that inclined surfaces of peaks of the lower bump foil and the upper bump foil overlap with each other.

CITATION LIST

Patent Literature

[PTL 1] Japanese Unexamined Patent Application Publication No. 2003-148461

SUMMARY OF INVENTION

Technical Problem

A gas bearing device is likely to be vibrationally unstable because of supporting a high-speed rotating body, and it is necessary to increase vibration energy absorption capacity in high-speed rotation in order to increase vibration stability, and enhanced vibration damping capacity is required.

There is a gas film between the top foil and the rotating member (on a rotary shaft side), and although vibration damping due to this gas film is conceivable, significant damping cannot be expected. Further, as another vibration damping element, frictional damping due to contact friction between the bump foil and the top foil and contact friction between the bump foil and the stationary holding member (on a housing side) is conceivable. Therefore, it is considered that the frictional damping contributes to vibration stabilization. Accordingly, enhancing frictional damping is expected to ensure vibration stabilization.

Since the bump foil has a corrugated shape, the bump foil expands and contracts in a left-right direction (in a circumferential direction in a case of a journal bearing) by collapsing in an up-down direction with respect to a load in the up-down direction (in a radial direction in a case of the journal bearing, and in an axial direction in a case of a thrust bearing) from the rotating member side, thereby obtaining the frictional damping generated due to sliding friction between the bump foil and the stationary holding member. However, since a sliding direction in which the frictional damping is generated with respect to the load in the up-down direction from the rotating member side is the left-right direction (circumferential direction), a contribution degree of the vibration damping against vibration caused by the load in the up-down direction is small.

In the above-described PTL 1, as shown in FIG. 3 of PTL 1, the bump foil having a double structure is shown in which the lower bump foil and the upper bump foil engage with each other such that the inclined surfaces of the corrugated-shaped peaks of the lower bump foil and the upper bump foil overlap with each other, but a corrugated-shaped bottom of the upper bump foil overlaps with a corrugated-shaped bottom of the lower bump foil in a state of contact.

Therefore, in PTL 1, even though the inclined surfaces of the peaks of the upper bump foil and the lower bump foil overlap with each other, the inclined surfaces of the peaks of the upper bump foil and the lower bump foil cannot slide against each other because of the load applied in the up-down direction, and a frictional damping effect cannot be expected at a contact surface of the overlap.

The present disclosure has been made in view of the above-described problems, and an object of the present disclosure is to provide a gas bearing device capable of suppressing unstable vibration of a rotating member by enhancing frictional damping of a bump foil disposed on a stationary holding member and improving vibration damping capacity.

Solution to Problem

In order to achieve the above-described object, according to the present disclosure, there is provided a gas bearing device including: a bump foil that is disposed on a stationary holding member facing a rotating member and that has a corrugated shape including a plurality of continuous peak portions; and a top foil that is disposed on the bump foil, in which the bump foil includes a first bump foil on a rotating member side and a second bump foil on a stationary holding member side, which are disposed to face each other, the first bump foil and the second bump foil engage with each other such that inclined surfaces of peak portions of the first bump foil and the second bump foil overlap with each other, and gaps are formed respectively between tops and between bottoms of the first bump foil and the second bump foil overlapping with each other.

Advantageous Effects of Invention

With the gas bearing device of the present disclosure, the gaps are formed respectively between the tops and between the bottoms of the first bump foil and the second bump foil overlapping with each other, so that the first bump foil can slide along a direction of a load acting in a direction from the rotating member side toward a stationary holding member side with respect to the acting load.

Therefore, a friction surface is formed on a contact surface between the inclined surfaces of the peak portions, making it easier to obtain frictional damping. Due to a frictional damping direction being aligned with a load action direction, effective damping against vibration in a load direction can be obtained. As a result, excellent damping can be ensured against vibration caused by a fluctuating load or an impact load applied from the rotating member side to the stationary member side, and unstable vibration of the rotating member can be suppressed.

DESCRIPTION OF EMBODIMENTS

Hereinafter, a gas bearing device according to an embodiment of the present disclosure will be described with reference to the drawings. Such an embodiment represents one aspect of the present disclosure and is not limited to this disclosure, and can be freely changed within the scope of the technical idea of the present disclosure.

One Embodiment

Figure 1:
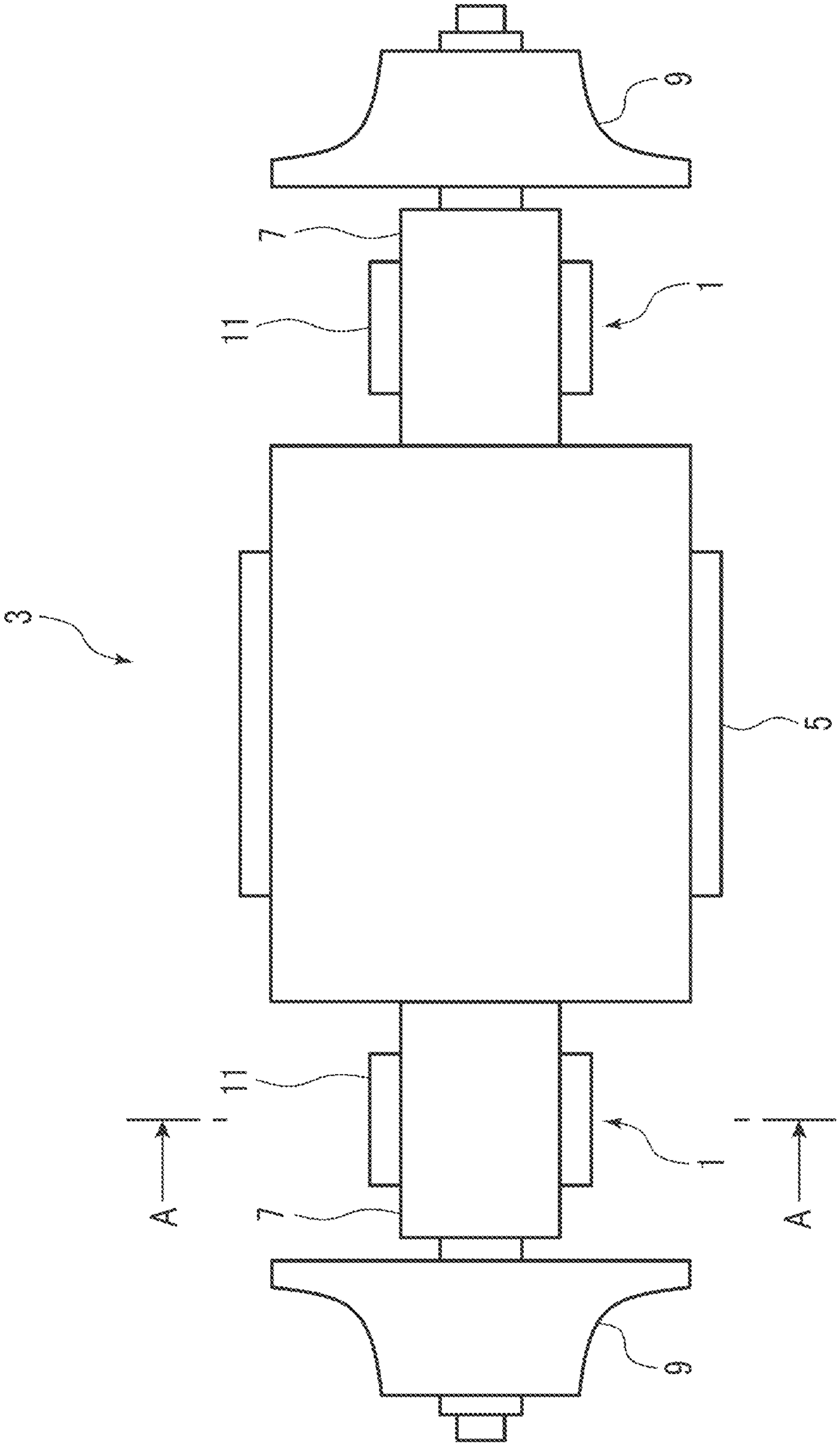
FIG. 1 is an overall schematic configuration diagram of a gas bearing device according to one embodiment of the present disclosure applied to a turbo compressor.

One embodiment of the present disclosure will be described with reference to FIGS. 1 to 3. FIG. 1 is an overall schematic configuration diagram of a gas bearing device 1 according to one embodiment applied to a turbo compressor 3. The turbo compressor 3 is configured to compress a fluid sucked in, with an impeller 9 attached to a tip portion of each of output shafts 7 protruding from a front and rear of a drive motor 5. The output shafts 7 at the front and rear of the drive motor 5 are each supported by a journal bearing 11.

The gas bearing device 1 of the present disclosure is applied to the journal bearing 11. As shown in FIG. 2, the gas bearing device 1 includes a rotary shaft (rotating member) 13 that is the output shaft 7 of the drive motor 5, and a cylindrical sleeve (stationary holding member) 15 that faces the rotary shaft 13 in a radial direction. A gas bearing portion 17 is provided between the rotary shaft 13 and the sleeve 15, and the gas bearing portion 17 includes a top foil 19 and a bump foil 21.

The top foil 19 is a cylindrical member forming a single plate-like shape as a whole, and faces the rotary shaft 13 and is elastically supported on the bump foil 21 by the bump foil 21, and forms a gas film K between the top foil 19 and the rotary shaft 13 when the rotary shaft 13 rotates. In addition, one end edge of the top foil 19 bends outward and engages with the sleeve 15, thereby performing positioning in a circumferential direction.

The bump foil 21 is disposed on an inner peripheral surface of the sleeve 15 and is formed in a corrugated shape including continuous peak portions 23 to have a predetermined elasticity. As shown in FIGS. 2 and 3, tops 25 and bottoms 29 of the continuous peak portions 23 constituting the corrugated shape of the bump foil 21 are disposed side by side in the circumferential direction of the rotary shaft 13, and the peak portion 23 is elastically deformed such that the height of the peak portion 23 decreases when the top foil 19 receives a radial pressure of the rotary shaft 13 from the gas film K, thereby supporting the top foil 19. In addition, similar to the top foil 19, one end edge of the bump foil 21 also bends outward and engages with the sleeve 15, thereby performing positioning in the circumferential direction.

Figure 2:
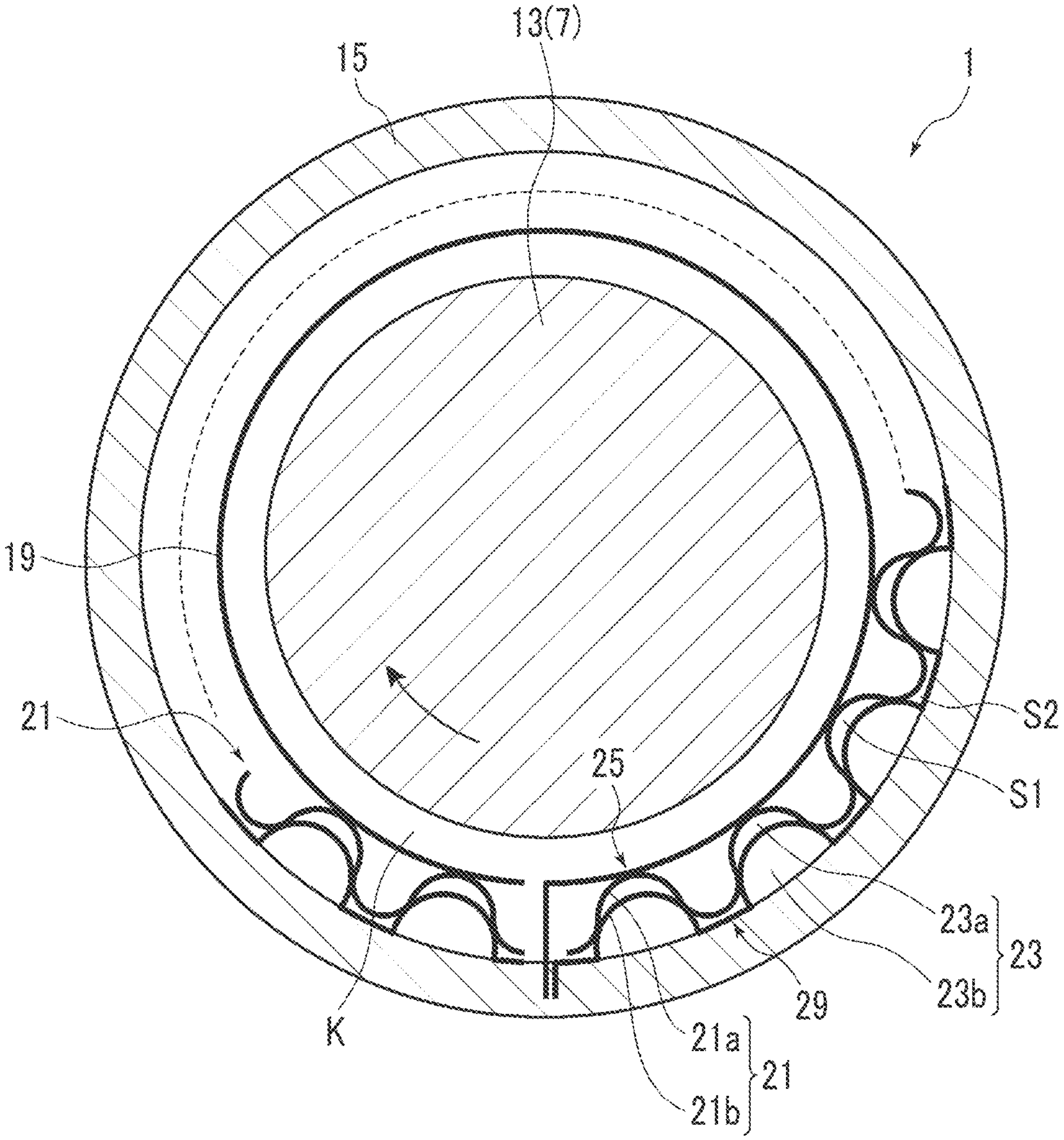
FIG. 2 is a schematic sectional view taken along line A-A of FIG. 1.
Figure 3:
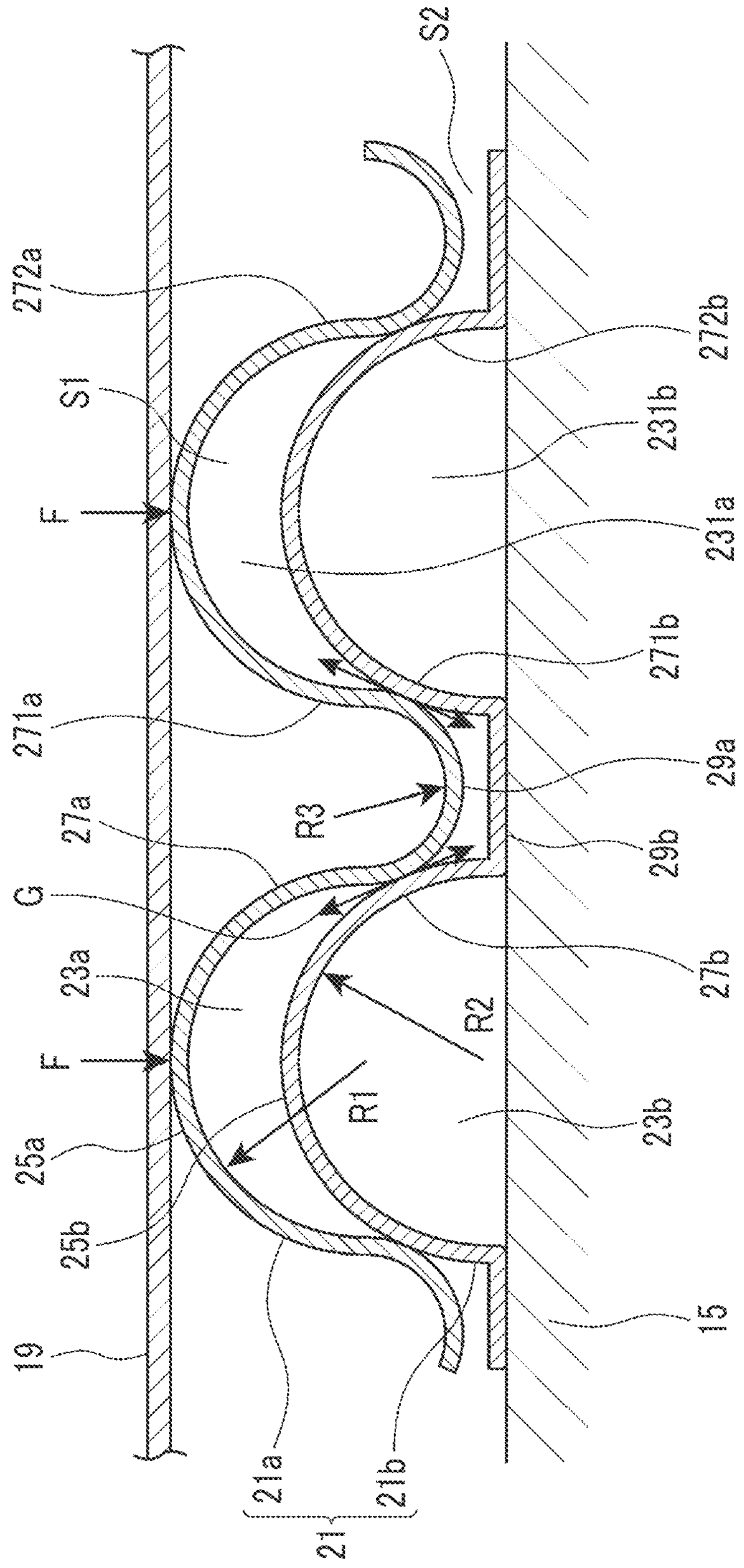
FIG. 3 is an enlarged view of a part of a bump foil of FIG. 2.

FIG. 3 is an enlarged schematic view of a part of the bump foil 21 of FIG. 2, and the sleeve 15 and the rotary shaft 13 have a circular shape, but are shown as flat shapes for convenience.

In addition, the bump foil 21 has a double structure and includes a first bump foil 21*a* on a rotary shaft 13 side (on an upper side in FIG. 3) and a second bump foil 21*b* on a sleeve 15 side (on a lower side in FIG. 3), which are disposed to face each other.

Further, the first bump foil 21*a* and the second bump foil 21*b* are in a state of engaging with each other in advance such that an inclined surface 27*a* of a continuous first bump peak portion 23*a* constituting the corrugated shape of the first bump foil 21*a* and an inclined surface 27*b* of a continuous second bump peak portion 23*b* constituting the corrugated shape of the second bump foil 21*b* overlap with each other.

In the following description, "a" is suffixed to reference numerals of configurations relating to the first bump foil 21*a*, and "b" is suffixed to reference numerals of configurations relating to the second bump foil 21*b*.

A gap S1 is formed between a top 25*a* of the first bump peak portion 23*a* and a top 25*b* of the second bump peak portion 23*b* overlapping with each other, and a gap S2 is formed between a bottom 29*a* of the first bump peak portion 23*a* and a bottom 29*b* of the second bump peak portion 23*b*.

In a case where the first bump foil 21*a* and the second bump foil 21*b* are formed of the same material, the plate thickness of the second bump foil 21*b* is formed to be thicker than that of the first bump foil 21*a*, and in a case where the plate thicknesses are the same, the second bump foil 21*b* is formed of a material having a higher rigidity than that of the first bump foil 21*a*.

Two operational effects can be mentioned as a result of increasing the rigidity of the second bump foil 21*b* as compared with the first bump foil 21*a*. That is, by reducing the rigidity of the first bump foil 21*a* (making the first bump foil 21*a* softer), the first bump foil 21*a* is likely to be pushed in the circumferential direction, thereby making it easier to control sliding of a contact surface between the first bump foil 21*a* and the second bump foil 21*b*. Conversely, in a case where the rigidity of the second bump foil 21*b* is reduced (made softer), there is a possibility of a wear issue due to occurrence of sliding at the contact surface between the second bump foil 21*b* and the sleeve 15. However, such an issue can be suppressed.

A state in which the first bump foil 21*a* and the second bump foil 21*b* overlap with each other will be described in detail with reference to FIG. 3. The first bump foil 21*a* includes a first bump one-side inclined surface 271*a* formed on one side of a first peak portion 231*a*, which is one of a plurality of the continuous first bump peak portions 23*a* constituting the corrugated shape, and a first bump other-side inclined surface 272*a* formed on the other side of the first peak portion 231*a*, and the second bump foil 21*b* includes a second bump one-side inclined surface 271*b* formed on one side of a second peak portion 231*b*, which is one of a plurality of the continuous second bump peak portions 23*b* constituting the corrugated shape, and a second bump other-side inclined surface 272*b* formed on the other side of the second peak portion 231*b*.

A back surface of the first bump one-side inclined surface 271*a* and a front surface of the second bump one-side inclined surface 271*b* are configured to be in contact with each other, and a back surface of the first bump other-side inclined surface 272*a* and a front surface of the second bump other-side inclined surface 272*b* are configured to be in contact with each other.

In addition, the top 25*a* of the first bump peak portion 23*a* has an arc shape (radius R1), and similarly, the top 25*b* of the second bump peak portion 23*b* also has an arc shape (radius R2), and the radius R1 of the top 25*a* of the first bump peak portion 23*a* and the radius R2 of the top 25*b* of the second bump peak portion 23*b* have a relationship in which the radius R1 of the top 25*a* of the first bump peak portion 23*a* is smaller than the radius R2 of the top 25*b* of the second bump peak portion 23*b* (R1<R2).

The bottom 29*a* of the first bump peak portion 23*a* also has an arc shape (radius R3) and has a relationship in which the radius R3 of the bottom 29*a* of the first bump peak portion 23*a* is smaller than the radius R1 of the top 25*a* of the first bump peak portion 23*a* (R3<R1). In addition, the bottom 29*b* of the second bump peak portion 23*b* is formed in a flat shape.

The shapes of the tops 25*a* and 25*b* and the bottoms 29*a* and 29*b* are examples, and any shapes may be used as long as the inclined surface 27*a* of the first bump peak portion 23*a* and the inclined surface 27*b* of the second bump peak portion 23*b* overlap with each other and frictional damping against vibration caused by a load F in an up-down direction (refer to an arrow in FIG. 3) is generated in the inclined surfaces 27*a* and 27*b*.

In addition, a direction of a frictional force G (refer to an arrow in FIG. 3) acting on a contact member between the overlapping inclined surfaces 27*a* and 27*b* with respect to the load F in the up-down direction is preferably a direction intersecting a direction orthogonal to the up-down direction which is the load action direction, and the more it aligns with the up-down direction of the load action direction, the greater the frictional damping effect against the vibration in the up-down direction is that can be obtained.

According to the above one embodiment, the back surfaces of the inclined surfaces 27*a* of the plurality of continuous first bump peak portions 23*a* constituting the corrugated shape of the first bump foil 21*a* and the front surfaces of the inclined surfaces 27*b* of the plurality of continuous second bump peak portions 23*b* constituting the corrugated shape of the second bump foil 21*b* overlap and engage with each other, so that the inclined surfaces 27*a* and 27*b* are in contact with each other, and a friction surface is formed.

Further, since the gaps S1 and S2 are formed respectively between the top 25*a* of the first bump peak portion 23*a* and the top 25*b* of the second bump peak portion 23*b* and between the bottom 29*a* of the first bump peak portion 23*a* and the bottom 29*b* of the second bump peak portion 23*b*, the first bump foil 21*a* can slide along a load direction with respect to the vibration caused by the load acting in a direction from the rotary shaft 13 toward the sleeve 15.

Therefore, frictional damping due to Coulomb friction can be easily obtained in the friction surface formed by the contact between the overlapping inclined surfaces 27*a* and 27*b*. The frictional damping direction is aligned with the load direction, so that effective damping against the vibration caused by the load acting in the direction from the rotary shaft 13 toward the sleeve 15 can be obtained. As a result, excellent damping can be ensured against the vibration caused by the fluctuating load or the impact load applied from the rotary shaft 13 to the sleeve 15, and the unstable vibration of the rotary shaft 13 can be suppressed.

In addition, according to the one embodiment, the back surface of the first bump one-side inclined surface 271*a* formed on one side of the first peak portion 231*a*, which is one of the plurality of continuous first bump peak portions 23*a*, and the front surface of the second bump one-side inclined surface 271*b* formed on one side of the second peak portion 231*b*, which is one of the plurality of continuous second bump peak portions 23*b*, are in contact with each other, and the back surface of the first bump other-side inclined surface 272*a* formed on the other side of the first peak portion 231*a*, which is one of the plurality of continuous first bump peak portions 23*a*, and the front surface of the second bump other-side inclined surface 272*b* formed on the other side of the second peak portion 231*b*, which is one of the plurality of continuous second bump peak portions 23*b*, are in contact with each other.

That is, for each peak portion of the plurality of continuous second bump peak portions 23*b* constituting the corrugated shape of the second bump foil 21*b*, one peak portion of the plurality of continuous first bump peak portions 23*a* constituting the corrugated shape of the first bump foil 21*a* overlaps thereover, a damping effect against the vibration caused by the load acting in the direction from the rotary shaft 13 toward the sleeve 15 is improved, and the rigidity of the entire bump foil 21 is enhanced.

Another Embodiment

Another embodiment will be described with reference to FIG. 4. In the gas bearing device 1 according to another embodiment, a first bump foil 51*a* and a second bump foil 51*b* constituting a bump foil 51 are different from those in the one embodiment. In the other embodiment, the same components as those of the one embodiment are designated by the same reference numerals, and a detailed description thereof will be omitted.

Figure 4:
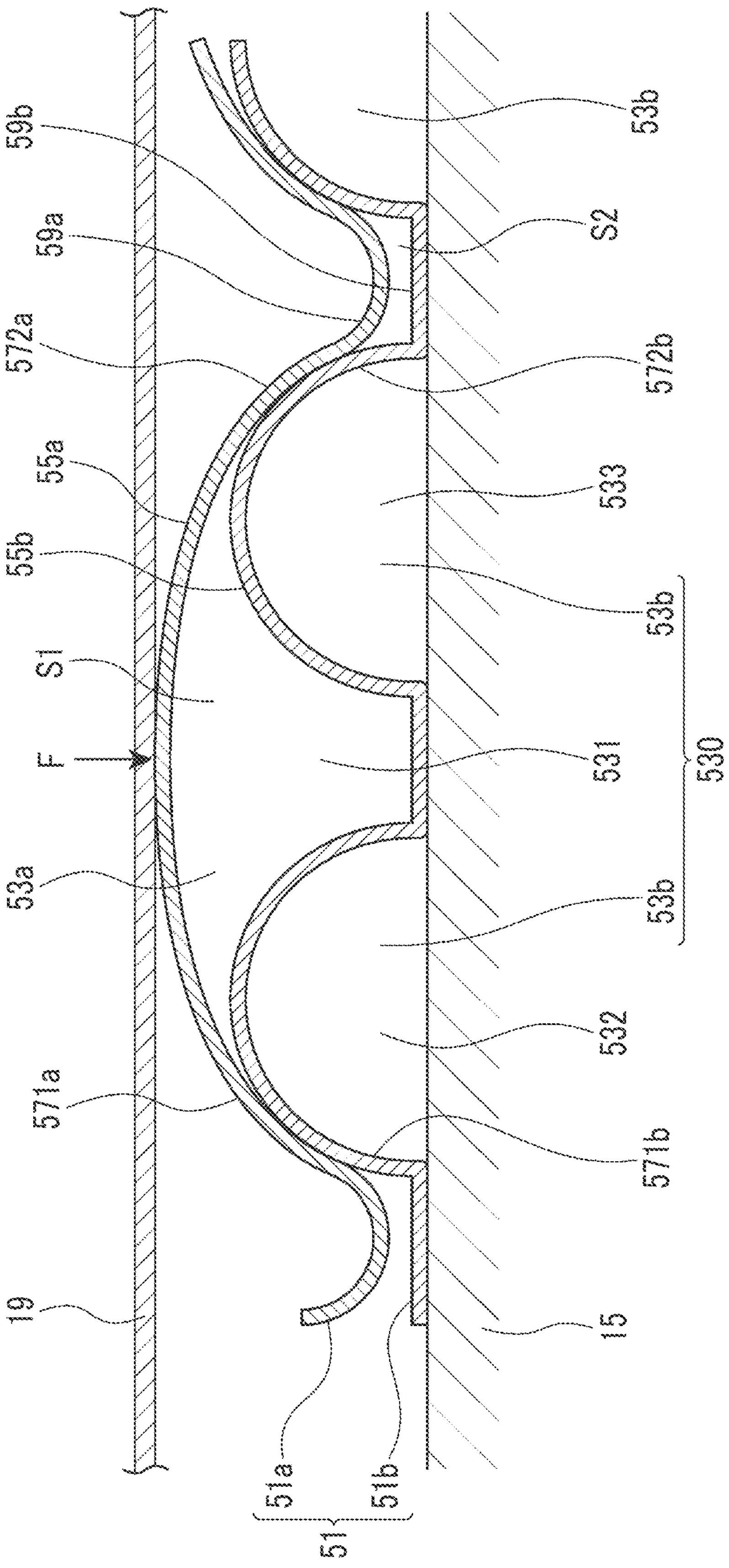
FIG. 4 is a view showing another embodiment of the bump foil different from the one embodiment and is an enlarged view corresponding to FIG. 3.

As shown in FIG. 4, the first bump foil 51*a* includes a first bump one-side inclined surface 571*a* formed on one side of a third peak portion 531, which is one of a plurality of continuous first bump peak portions 53*a* constituting the corrugated shape, and a first bump other-side inclined surface 572*a* formed on the other side of the third peak portion 531, and the second bump foil 51*b* includes, in a continuous peak portion 530 (two continuous second bump peak portions 53*b* in FIG. 4) that is a part of a plurality of continuous second bump peak portions 53*b* constituting the corrugated shape, a second bump one-side inclined surface 571*b* formed on one side of a fourth peak portion 532, which is a second bump peak portion 53*b* located on a most one side in the continuous peak portion 530, and a second bump other-side inclined surface 572*b* formed on the other side of a fifth peak portion 533, which is a second bump peak portion 53*b* located on a most other side in the continuous peak portion 530.

A back surface of the first bump one-side inclined surface 571*a* and a front surface of the second bump one-side inclined surface 571*b* are in contact with each other, a back surface of the first bump other-side inclined surface 572*a* and a front surface of the second bump other-side inclined surface 572*b* are in contact with each other, and the first bump foil 51*a* and the second bump foil 51*b* are configured to overlap and engage with each other in advance.

In addition, similar to the one embodiment, the gap S1 is formed between a top 55*a* of the first bump peak portion 53*a* and tops 55*b* of the second bump peak portions 53*b*, and the gap S2 is formed between a bottom 59*a* of the first bump peak portion 53*a* and a bottom 59*b* of the second bump peak portion 53*b*.

In FIG. 4, an example is shown in which the number of the continuous second bump peak portions 53*b* of the continuous peak portion 530 is two peak portions, but the number is not limited to this and is freely set based on the damping characteristics, the rigidity, and the like of the entire bump foil 51.

According to the other embodiment, the third peak portion 531, which is one of the plurality of continuous first bump peak portions 53*a* constituting the corrugated shape of the first bump foil 51*a,* overlaps to straddle the continuous peak portion 530, which is a part of the plurality of continuous second bump peak portions 53*b* constituting the corrugated shape of the second bump foil 51*b,* so that the rigidity and the frictional damping force of the entire bump foil can be adjusted based on the number of peak portions of the second bump peak portions 53*b* straddled by the third peak portion 531, and the degree of freedom in designing the rigidity and the frictional damping force is improved.

Still Another Embodiment

Still another embodiment will be described with reference to FIG. 5. Unlike the above-described one embodiment shown in FIG. 3 and the other embodiment shown in FIG. 4, surface treatment is further performed on the contact member. In still another embodiment, the same components as those of the one embodiment and the other embodiment are designated by the same reference numerals, and a detailed description thereof will be omitted.

Figure 5:
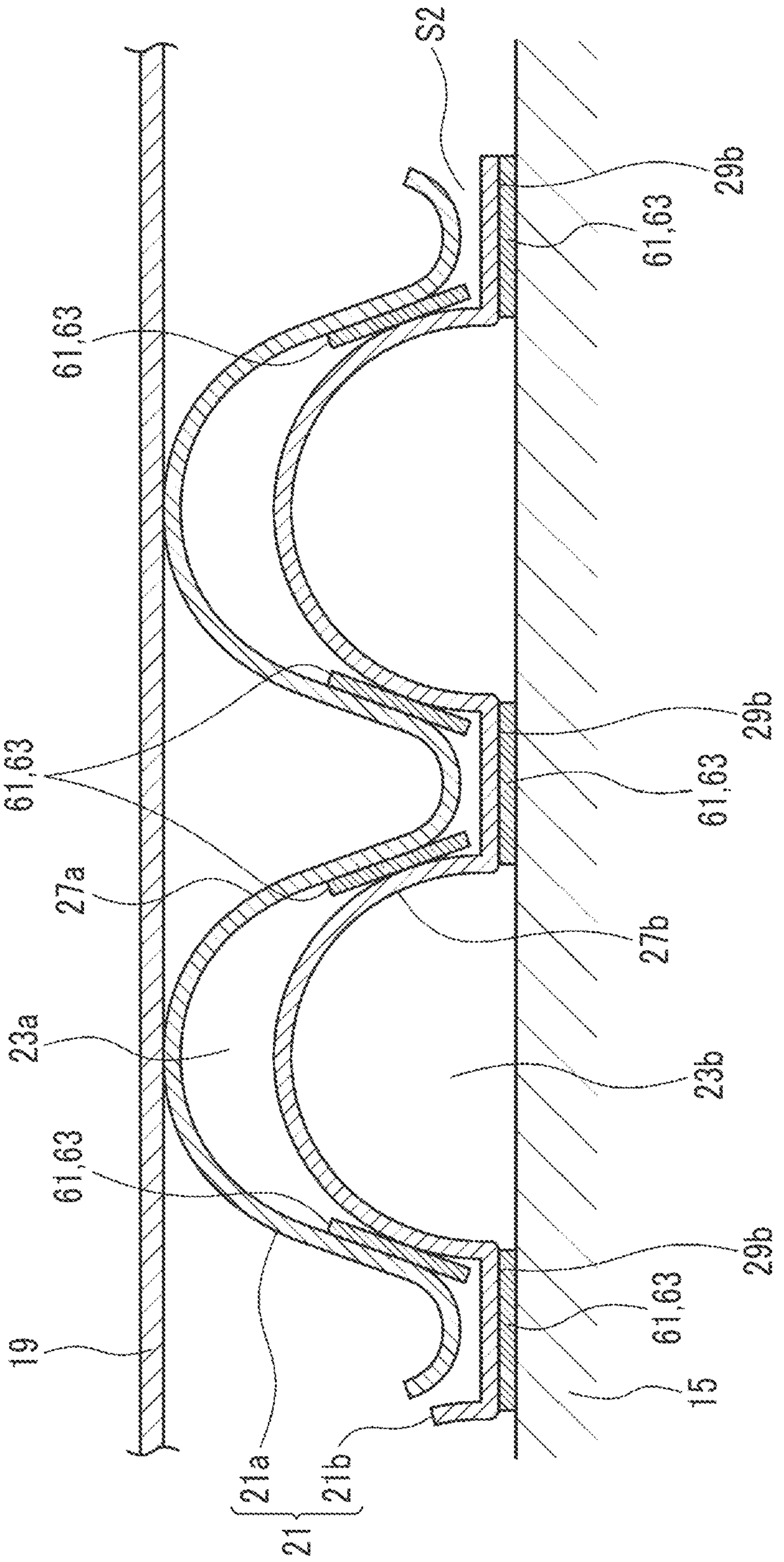
FIG. 5 is a view showing still another embodiment and is a conceptual diagram of a surface-treated layer formed on a contact member in FIG. 3.

FIG. 5 shows a surface-treated layer formed on the contact member in the one embodiment of FIG. 3, but the same applies to a surface-treated layer on the contact member in the other embodiment of FIG. 4.

In FIG. 5, in the respective overlapping inclined surfaces 27*a* and 27*b* of the first bump peak portion 23*a* and the second bump peak portion 23*b,* a hard coating film 61 is formed on any one or both of the back surface of the inclined surface 27*a* of the first bump peak portion 23*a* and the front surface of the inclined surface 27*b* of the second bump peak portion 23*b*. As the hard coating film 61, for example, a diamond-like carbon (DLC) coating film (amorphous carbon coating film), or a carbon nitride coating film (CNx coating film) is suitable.

In addition, instead of the hard coating film 61, a molybdenum disulfide shot-treated layer 63 may be formed.

In this manner, in the respective overlapping inclined surfaces 27*a* and 27*b* of the first bump peak portion 23*a* and the second bump peak portion 23*b,* wear resistance of the contact member is improved by the hard coating film or the molybdenum disulfide shot-treated layer formed on a contact surface side of one or both of the inclined surfaces, and the first bump peak portion 23*a* and the second bump peak portion 23*b* are prevented from being stuck to each other without occurrence of sliding at the contact member, thereby preventing the loss of frictional damping effect.

Further, in addition to the formation of the hard coating film 61 or the molybdenum disulfide shot-treated layer 63 on the respective inclined surfaces 27*a* and 27*b* described above, in the contact surface between the sleeve 15 and the bottom 29*b* of the second bump peak portion 23*b,* the hard coating film is also formed on any one or both of a back surface of the bottom 29*b* of the second bump peak portion 23*b* and a front surface of the sleeve 15. As the hard coating film 61, for example, a diamond-like carbon (DLC) coating film (amorphous carbon coating film), or a carbon nitride coating film (CNx coating film) is suitable.

In addition, the molybdenum disulfide shot-treated layer may be formed instead of the hard coating film.

As described above, the wear resistance of the contact member is improved by the hard coating film 61 or the molybdenum disulfide shot-treated layer 63 formed on the contact surface side of one or both of the sleeve 15 and the bottom 29*b* of the second bump peak portion 23*b,* and the sleeve 15 and the bottom 29*b* of the second bump peak portion 23*b* are prevented from being stuck to each other without left-right sliding at the contact member, making it easier for the bottom 29*b* of the second bump peak portion 23*b* to slide in a left-right direction.

By making it easier for the bottom 29*b* of the second bump peak portion 23*b* to slide in the left-right direction, sliding of the contact member between the inclined surfaces 27*a* and 27*b* of the first bump peak portion 23*a* and the second bump peak portion 23*b* is likely to occur, and the frictional damping effect in the inclined surfaces 27*a* and 27*b* can be further easily obtained.

In the embodiments described above, a radial bearing that supports the rotary shaft 13 in the radial direction has been described, but the same operational effects can also be obtained in a thrust bearing that supports the rotary shaft 13 in an axial direction.

The contents described in each of the above-described embodiments are understood as follows, for example.

[1] According to the present disclosure, there is provided a gas bearing device (1) including: a bump foil (21) that is disposed on a stationary holding member (15) facing a rotating member (13) and that has a corrugated shape including a plurality of continuous peak portions (23); and a top foil (19) that is disposed on the bump foil, in which the bump foil includes a first bump foil (21*a*) on a rotating member side and a second bump foil (21*b*) on a stationary holding member side, which are disposed to face each other, the first bump foil and the second bump foil engage with each other such that inclined surfaces (27*a,* 27*b*) of peak portions (23*a,* 23*b*) of the first bump foil and the second bump foil overlap with each other, and gaps (S1, S2) are formed respectively between tops (25*a,* 25*b*) and between bottoms (29*a,* 29*b*) of the peak portions of the first bump foil and the second bump foil overlapping with each other.

According to the configuration described in [1], the first bump foil (21*a*) and the second bump foil (21*b*) engage with each other such that the inclined surfaces (27*a,* 27*b*) of the peak portions (23*a,* 23*b*) overlap with each other, and the gaps (S1, S2) are formed respectively between the tops (25*a,* 25*b*) and between the bottoms (29*a,* 29*b*) of the peak portions of the first bump foil and the second bump foil overlapping each other, so that the first bump foil (21*a*) can slide along the load direction with respect to the vibration caused by the load acting in the direction from the rotating member (13) toward the stationary holding member (15).

Therefore, frictional damping due to Coulomb friction can be easily obtained in the friction surface formed by the contact between the overlapping inclined surfaces. Due to the frictional damping direction being aligned with the load direction, effective damping against the vibration caused by the load acting in the direction from the rotating member toward the stationary holding member can be obtained. As a result, excellent damping can be ensured against the vibration caused by the fluctuating load or the impact load applied from the rotating member to the stationary holding member, and unstable vibration of the rotating member can be suppressed.

[2] According to some embodiments, in the configuration described in [1], the first bump foil (21*a*) includes a first bump one-side inclined surface (271*a*) formed on one side of a first peak portion (231*a*), which is one of a plurality of continuous first bump peak portions (23*a*) constituting the corrugated shape, and a first bump other-side inclined surface (272*a*) formed on the other side of the first peak portion, the second bump foil (21*b*) includes a second bump one-side inclined surface (271*b*) formed on one side of a second peak portion (231*b*), which is one of a plurality of continuous second bump peak portions (23*b*) constituting the corrugated shape, and a second bump other-side inclined surface (272*b*) formed on the other side of the second peak portion, a back surface of the first bump one-side inclined surface (271*a*) and a front surface of the second bump one-side inclined surface (271*b*) are configured to be in contact with each other, and a back surface of the first bump other-side inclined surface (272*a*) and a front surface of the second bump other-side inclined surface (272*b*) are configured to be in contact with each other.

According to the configuration described in [2], for each peak portion of the plurality of continuous second bump peak portions (23*b*) constituting the corrugated shape of the second bump foil (21*b*), one peak portion of the plurality of continuous first bump peak portions (23*a*) constituting the corrugated shape of the first bump foil (21*a*) overlaps thereover, so that the rigidity of the entire bump foil (21) is enhanced.

[3] According to some embodiments, in the configuration described in [1], the first bump foil (51*a*) includes a first bump one-side inclined surface (571*a*) formed on one side of a third peak portion (531), which is one of a plurality of continuous first bump peak portions (53*a*) constituting the corrugated shape, and a first bump other-side inclined surface (572*a*) formed on the other side of the third peak portion (531), the second bump foil (51*b*) includes, in a continuous peak portion (530) that is a part of a plurality of continuous second bump peak portions (53*b*) constituting the corrugated shape, a second bump one-side inclined surface (571*b*) formed on one side of a fourth peak portion (532), which is a second bump peak portion (53*b*) located on a most one side in the continuous peak portion (530), and a second bump other-side inclined surface (572*b*) formed on the other side of a fifth peak portion (533), which is a second bump peak portion (53*b*) located on a most other side in the continuous peak portion (530), a back surface of the first bump one-side inclined surface (571*a*) and a front surface of the second bump one-side inclined surface (571*b*) are configured to be in contact with each other, and a back surface of the first bump other-side inclined surface (572*a*) and a front surface of the second bump other-side inclined surface (572*b*) are configured to be in contact with each other.

According to the configuration described in [3], one peak portion of the plurality of continuous first bump peak portions (53*a*) constituting the corrugated shape of the first bump foil (51*a*) overlaps to straddle the continuous peak portion (530), which is a part of the plurality of continuous second bump peak portions (53*b*) constituting the corrugated shape of the second bump foil (51*b*), so that the rigidity and the frictional damping force of the entire bump foil (51) can be adjusted based on the number of peak portions to be straddled, and the degree of freedom in designing the rigidity and the frictional damping force is improved.

[4] According to some embodiments, in the configuration described in [2] or [3], in respective overlapping inclined surfaces (271*a*, 272*a*, 271*b*, 272*b*, 571*a*, 572*a*, 571*b*, 572*b*) of the first bump peak portion (23*a*, 53*a*) and the second bump peak portion (23*b*, 53*b*), a hard coating film (61) is formed on any one or both of a back surface of the inclined surface of the first bump peak portion and a front surface of the inclined surface of the second bump peak portion.

According to the configuration described in [4], in the respective overlapping inclined surfaces of the first bump peak portion (23*a*, 53*a*) and the second bump peak portion (23*b*, 53*b*), the wear resistance of the contact member is improved by the hard coating film (61) formed on the contact surface side of one or both of the inclined surfaces, and the first bump peak portion and the second bump peak portion are prevented from being stuck to each other without occurrence of sliding at the contact member, thereby preventing the loss of frictional damping effect.

[5] According to some embodiments, in the configuration described in [2] or [3], in respective overlapping inclined surfaces (271*a*, 272*a*, 271*b*, 272*b*, 571*a*, 572*a*, 571*b*, 572*b*) of the first bump peak portion (23*a*, 53*a*) and the second bump peak portion (23*b*, 53*b*), a molybdenum disulfide shot-treated layer (63) is formed on any one or both of a back surface of the inclined surface of the first bump peak portion and a front surface of the inclined surface of the second bump peak portion.

According to the configuration described in [5], in the respective overlapping inclined surfaces of the first bump peak portion (23*a*, 53*a*) and the second bump peak portion (23*b*, 53*b*), the wear resistance of the contact member is improved by the molybdenum disulfide shot-treated layer (63) formed on the contact surface side of one or both of the inclined surfaces, and the first bump peak portion and the second bump peak portion are prevented from being stuck to each other without occurrence of sliding at the contact member, thereby preventing the loss of frictional damping effect.

[6] According to some embodiments, in the configuration described in [4] or [5], in a contact surface between the stationary holding member (15) and a bottom (29*b*, 59*b*) of the second bump peak portion (23*b*, 53*b*), a hard coating film (61) is further formed on any one or both of a back surface of the bottom of the second bump peak portion and a front surface of the stationary holding member.

According to the configuration described in [6], the hard coating film (61) formed on the contact surface of one or both of the stationary holding member (15) and the bottom (29*b*, 59*b*) of the second bump peak portion (23*b*, 53*b*) allows the second bump peak portion to slide on the stationary member more easily in the left-right direction without being stuck, so that the sliding of the contact member between the inclined surfaces of the first bump peak portion and the second bump peak portion is likely to occur, and the frictional damping effect in the inclined surfaces can be further easily obtained.

[7] According to some embodiments, in the configuration described in [4] or [5], in a contact surface between the stationary holding member (15) and a bottom (29*b*, 59*b*) of the second bump peak portion (23*b*, 53*b*), a molybdenum disulfide shot-treated layer (63) is further formed on any one or both of a back surface of the bottom of the second bump peak portion and a front surface of the stationary holding member.

According to the configuration described in [7], lubricating action of the molybdenum disulfide shot-treated layer (63) formed on the contact surface of one or both of the stationary holding member (15) and the bottom (29*b*, 59*b*) of the second bump peak portion (23*b*, 53*b*) allows the second bump foil to slide on the stationary member more easily in the left-right direction without being stuck, so that the sliding of the contact member between the inclined surfaces of the first bump peak portion and the second bump peak portion is likely to occur, and the frictional damping effect in the inclined surfaces can be further easily obtained.

[8] According to some embodiments, in the configuration described in [1] to [7], the stationary holding member (15) is a stationary holding member of a journal bearing (11) that is disposed to face the rotating member (13) in a radial direction.

According to the configuration described in [8], the operational effects of each configuration of [1] to [7] can be obtained in the journal bearing (11).

REFERENCE SIGNS LIST

1: gas bearing device
3: turbo compressor
11: journal bearing
13: rotary shaft (rotating member)
15: sleeve (stationary holding member)
19: top foil
21, 51: bump foil
21*a*, 51*a*: first bump foil
21*b*, 51*b*: second bump foil
23, 53: peak portion
23*a*, 53*a*: first bump peak portion
23*b*, 53*b*: second bump peak portion
231*a*: first peak portion
231*b*: second peak portion
25, 25*a*, 25*b*, 55*a*, 55*b*: top of peak portion
29, 29*a*, 29*b*, 59*a*, 59*b*: bottom of peak portion
27*a*, 27*b*: inclined surface of peak portion
271*a*, 571*a*: first bump one-side inclined surface
272*a*, 572*a*: first bump other-side inclined surface
271*b*, 571*b*: second bump one-side inclined surface
272*b*, 572*b*: second bump other-side inclined surface
29*a*, 29*b*: bottom of peak portion
530: continuous peak portion
531: third peak portion
532: fourth peak portion
533: fifth peak portion
61: hard coating film
63: molybdenum disulfide shot-treated layer
F: load
K: gas film
G: frictional force
S1, S2: gap

The invention claimed is:

1. A gas bearing device comprising:

a bump foil that is disposed on a stationary holding member facing a rotating member and that has a corrugated shape including a plurality of continuous peak portions; and a top foil that is disposed on the bump foil, wherein the bump foil includes a first bump foil on a rotating member side and a second bump foil on a stationary holding member side, which are disposed to face each other, the first bump foil and the second bump foil engage with each other such that inclined surfaces of peak portions of the first bump foil and the second bump foil overlap with each other, and gaps are formed respectively between tops and between bottoms of the peak portions of the first bump foil and the second bump foil overlapping with each other, wherein the first bump foil includes a first bump one-side inclined surface formed on one side of a first peak portion, which is one of a plurality of continuous first bump peak portions constituting the corrugated shape, and a first bump other-side inclined surface formed on the other side of the first peak portion, the second bump foil includes a second bump one-side inclined surface formed on one side of a second peak portion, which is one of a plurality of continuous second bump peak portions constituting the corrugated shape, and a second bump other-side inclined surface formed on the other side of the second peak portion, a back surface of the first bump one-side inclined surface and a front surface of the second bump one-side inclined surface are configured to be in contact with each other at a first circumferential position, a back surface of the first bump other-side inclined surface and a front surface of the second bump other-side inclined surface are configured to be in contact with each other at a second circumferential position, and the gap between the tops is formed in an entirety from the first circumferential position toward the other side to the second circumferential position.

2. The gas bearing device according to claim 1, wherein, in respective overlapping inclined surfaces of the first bump peak portion and the second bump peak portion, a hard coating film is formed on any one or both of a back surface of the inclined surface of the first bump peak portion and a front surface of the inclined surface of the second bump peak portion.

3. The gas bearing device according to claim 2, wherein, in a contact surface between the stationary holding member and a bottom of the second bump peak portion, a hard coating film is further formed on any one or both of a back surface of the bottom of the second bump peak portion and a front surface of the stationary holding member.

4. The gas bearing device according to claim 2, wherein, in a contact surface between the stationary holding member and a bottom of the second bump peak portion, a molybdenum disulfide shot-treated layer is further formed on any one or both of a back surface of the bottom of the second bump peak portion and a front surface of the stationary holding member.

5. The gas bearing device according to claim 2, wherein, in respective overlapping inclined surfaces of the first bump peak portion and the second bump peak portion, a molybdenum disulfide shot-treated layer is formed on any one or both of a back surface of the inclined surface of the first bump peak portion and a front surface of the inclined surface of the second bump peak portion.

6. The gas bearing device according to claim 1, wherein the stationary holding member is a stationary holding member of a journal bearing that is disposed to face the rotating member in a radial direction.

7. A gas bearing device comprising:

a bump foil that is disposed on a stationary holding member facing a rotating member and that has a corrugated shape including a plurality of continuous peak portions; and a top foil that is disposed on the bump foil, wherein the bump foil includes a first bump foil on a rotating member side and a second bump foil on a stationary holding member side, which are disposed to face each other, the first bump foil and the second bump foil engage with each other such that inclined surfaces of peak portions of the first bump foil and the second bump foil overlap with each other, gaps are formed respectively between tops and between bottoms of the peak portions of the first bump foil and the second bump foil overlapping with each other, wherein the first bump foil includes a first bump one-side inclined surface formed on one side of a third peak portion, which is one of a plurality of continuous first bump peak portions constituting the corrugated shape, and a first bump other-side inclined surface formed on the other side of the third peak portion, the second bump foil includes, in a continuous peak portion that is a part of a plurality of continuous second bump peak portions constituting the corrugated shape, a second bump one-side inclined surface formed on one side of a fourth peak portion, which is a second bump peak portion located on a most one side in the continuous peak portion, and a second bump other-side inclined surface formed on the other side of a fifth peak portion, which is a second bump peak portion located on a most other side in the continuous peak portion, a back surface of the first bump one-side inclined surface and a front surface of the second bump one-side inclined surface are configured to be in contact with each other, and a back surface of the first bump other-side inclined surface and a front surface of the second bump other-side inclined surface are configured to be in contact with each other.

* * * * *